(12) United States Patent
Achilles et al.

(10) Patent No.: US 8,091,019 B2
(45) Date of Patent: Jan. 3, 2012

(54) SUPPORTING VARIABLE DATA STRUCTURES AND CONSTANT DATA STRUCTURES IN A HARDWARE-BASED EXTENSIBLE MARKUP LANGUAGE (XML) POST PROCESSING ENGINE (PPE)

(75) Inventors: Heather D. Achilles, Hudson, NH (US); Joseph H. Allen, Belmont, MA (US); David J. Hoeweler, Cambridge, MA (US); Jeffrey M. Peters, Leominster, MA (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 12/358,050

(22) Filed: Jan. 22, 2009

(65) Prior Publication Data

US 2010/0185941 A1 Jul. 22, 2010

(51) Int. Cl.
*G06F 17/00* (2006.01)
(52) U.S. Cl. .......................... 715/234; 715/235; 715/236
(58) Field of Classification Search .................. 715/234, 715/235–238
See application file for complete search history.

(56) References Cited

U.S. PATENT DOCUMENTS

| | | | |
|---|---|---|---|
| 7,287,217 B2 | 10/2007 | Kuznetsov et al. | |
| 7,318,194 B2 | 1/2008 | Achilles et al. | |
| 2002/0038320 A1* | 3/2002 | Brook | 707/513 |
| 2005/0055631 A1* | 3/2005 | Scardina et al. | 715/513 |
| 2006/0236224 A1* | 10/2006 | Kuznetsov et al. | 715/513 |
| 2006/0236225 A1 | 10/2006 | Achilles et al. | |
| 2006/0253465 A1* | 11/2006 | Willis et al. | 707/100 |
| 2008/0040657 A1 | 2/2008 | Kuznetsov et al. | |

* cited by examiner

*Primary Examiner* — Quoc A Tran
(74) *Attorney, Agent, or Firm* — Kunzler Needham Massey & Thorpe

(57) ABSTRACT

A method, computer program product, and system are disclosed for supporting variable data structures and constant data structures in a hardware-based XML PPE. The method may include inserting one or more constant Type-Length-Attributes (TLAs) into an output stream. The constant TLAs are inserted from one or more constant node-sets referenced from a constant table. The method may also include creating one or more variable node-sets. Each variable node-set includes one or more variable TLAs (TLAs saved from a base XML document) and is mapped to a variable table. The method may also include inserting one or more variable TLAs into the output stream inserted from one or more variable node-sets referenced from the variable table.

21 Claims, 6 Drawing Sheets

SUPPORTING VARIABLE DATA STRUCTURES AND CONSTANT DATA STRUCTURES IN A HARDWARE-BASED EXTENSIBLE MARKUP LANGUAGE (XML) POST PROCESSING ENGINE (PPE)

BACKGROUND OF THE INVENTION

1. Field of the Invention

This invention relates to a hardware-based XML PPE and more particularly relates to supporting variable data structures and constant data structures in a hardware-based XML PPE.

2. Description of the Related Art

The emergence of Extensible Markup Language (XML) as a primary web and business communications format has led to the proliferation of XML appliances, or computer systems designed specifically to route, accelerate, and process XML and other common messaging formats. The WebSphere® DataPower® appliance series from International Business Machines (IBM) is one example of a series of these specialized XML systems. These appliances contain an XML accelerator card, DataPower's XG4, that contains an XML Post Processing Engine (PPE). The PPE is a processor with specialized instructions targeted for doing XML processing such as schema validation and SOAP lookups.

While programmable, one limitation of the PPE is that the PPE does not have the capability of processing variables in any of its programs. Because of this limitation, the PPE can only assist in processing XML Transformations (XSLT) stylesheets by performing such tasks as XML Schema validation. However, the PPE cannot perform the necessary transformations to fully process an XSLT stylesheet. This work must fall back to slower general purpose processors.

SUMMARY OF THE INVENTION

The present invention has been developed to provide for supporting variable data structures and constant data structures in a hardware-based XML PPE.

A method is presented for inserting one or more constant Type-Length-Attributes (TLAs) into an output stream, creating one or more variable node-sets, and inserting one or more variable TLAs into the output stream.

In one embodiment, the method includes inserting one or more constant Type-Length-Attributes (TLAs) into an output stream. The constant TLAs are inserted from one or more constant node-sets referenced from a constant table. The method may also include creating one or more variable node-sets. Each variable node-set includes one or more variable TLAs. In addition, each variable node-set is mapped to a variable table. The method may also include inserting one or more variable TLAs into the output stream inserted from one or more variable node-sets referenced from the variable table.

In one embodiment, the constant node-sets are created by an XML Transformations (XSLT) stylesheet compiler. Each constant node-set includes one or more constant TLAs and is mapped to the constant table. The XSLT stylesheet compiler may compile an XSLT stylesheet into a plurality of constant TLAs and PPE machine code.

In addition, the method may include parsing a base XML document into a TLA stream. The TLA stream may be a plurality of variable TLAs. Furthermore, the method may also store a variable TLA and a constant TLA in a buffer. In this embodiment, the variable TLA and constant TLA includes a pointer to a linked list. The linked list may store text and include one or more memory blocks and a reference counter.

Additionally, the method may also include freeing the one or more memory blocks of the linked list in response to the reference counter equaling zero. Finally, the method may include selecting an input stream from the group consisting of a constant TLA input stream, a variable TLA input stream, and a standard TLA input stream.

A computer program product is provided for supporting variable data structures and constant data structures in a hardware-based XML PPE. These modules in the described embodiments include compilation module, a constant insertion module, a variable creation module, and a variable insertion module. Furthermore, in one embodiment, the computer program product contains a parsing module, a buffer module, a memory management module, and a multiplexer module. These modules may be configured to functionally perform the necessary steps as described above in relation to the method. In addition, each variable TLA and each constant TLA may include a TLA indicator to indicate a TLA type, or whether the TLA is a variable TLA or constant TLA.

A system of the present invention is also presented for supporting variable data structures and constant data structures in a hardware-based XML PPE. Like the computer program product, the system may also be configured to functionally perform the necessary steps as described above in relation to the method. The system may be embodied as an XSLT stylesheet compiler and an XML accelerator with a PPE. In some embodiments, the system may also include a buffer and a multiplexer.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
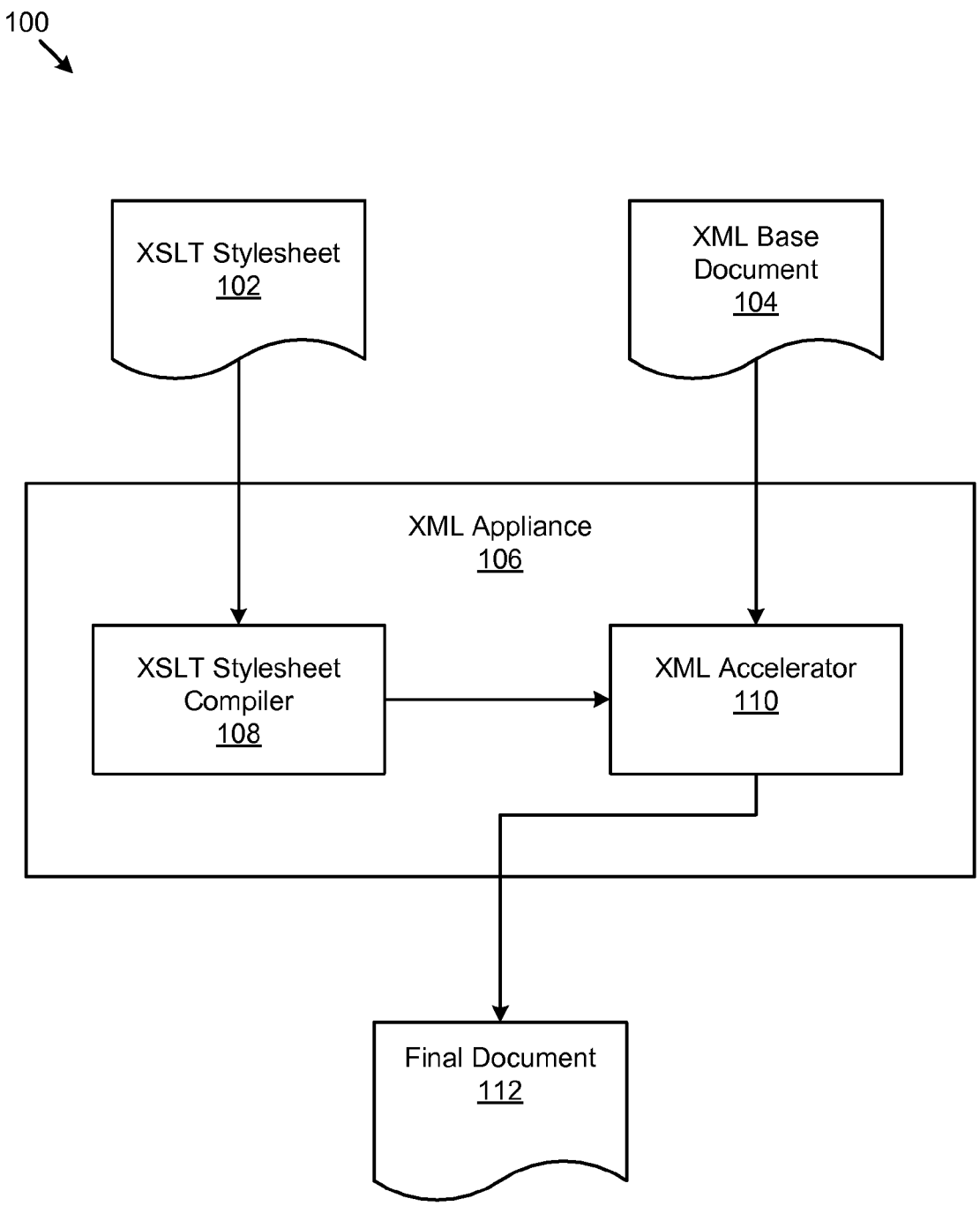
FIG. 1 is a schematic block diagram illustrating one embodiment of a system for supporting variable data structures and constant data structures in a hardware-based XML PPE.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for supporting variable data structures and constant data structures in a hardware-based XML Post Processing Engine (PPE). The system 100 includes an XSLT stylesheet 102, an XML base document 104, an XML appliance 106 with an XSLT stylesheet compiler 108 and an XML accelerator 110, and a final document 112. Those of skill in the art recognize that the system 100 may be simpler or more complex than illustrated, so long as the system 100 includes modules or sub-systems that correspond to those described herein.

The XSLT stylesheet 102 may include an a document with XML syntax used to transform XML base documents 104 into other XML documents or documents in different formats. The transformations specified by the XSLT may include data patterns, variable order, or other document formatting. An XSLT stylesheet 102 is often used to transform data stored in XML base documents 104 to a form readable on the web.

The following is an example of an XSLT stylesheet:

```
<xsl:template match="/">
    <html>
    <body>
        <h2>My CD Collection</h2>
        <xsl:apply-templates/>
    </body>
    </html>
</xsl:template>
<xsl:template match="cd">
    <p>
      <xsl:apply-templates select="title"/>
      <xsl:apply-templates select="artist"/>
    </p>
</xsl:template>
<xsl:template match="title">
    Title: <span style="color:#ff0000">
    <xsl:value-of select="."/></span>
    <br />
</xsl:template>
<xsl:template match="artist">
    Artist: <span style="color:#00ff00">
    <xsl:value-of select="."/></span>
    <br />
</xsl:template>
```

Example Code 1

This stylesheet instructs an XML appliance 106 to scan an XML base document 104 to find all occurrences of <cd> and reformat the data associated with the tags <title> and <artist> so that the list of the CD collection always has the CD title listed before the artist.

The XML base document 104 may include an XML document with variables and elements as is known by one of ordinary skill in the art. Furthermore, the XML base document 104 may be compatible with the XSLT stylesheet 102 with corresponding variable and element names. The following is an example of an XML base document 104 listing artists "<artist>" and album titles "<title>" under the "<cd>" tag:

```
<cd>
    <title> Sargent Pepper's Lonely Hearts Club Band</title>
    <artist> The Beatles </artist>
```

```
<cd>
<cd>
    <title> Hey Jude </title>
    <artist> The Beatles </artist>
<cd>
<cd>
    <title> Surfin' USA </title>
    <artist> The Beach Boys </artist>
<cd>
```

Example Code 2

The XML appliance 106 may comprise a Service Oriented Architecture (SOA) appliance such as an IBM WebSphere® DataPower® appliance or other middleware appliance capable of sending, receiving, routing and accelerating Extensible Markup Language (XML) messages and other message formats. The XML appliance 106 may have one or more conventional processors.

Furthermore, the XML appliance 106 may include an XSLT stylesheet compiler 108 to process the XSLT stylesheet 102 and feed the output into the XML accelerator 110. The XSLT stylesheet compiler 108 compiles the XSLT stylesheet 102 into a stream of constant Type Length Attributes (TLAs). A TLA is a data structure created and used by the XML appliance 106 to represent a portion of an input XML document. For example, consider the XML document segment:

<root> example </root>

This segment may be represented by four TLAs as follows:
    start-element, 4, QNAME for root close-start-element, 0,0
    text, 21, pointer to the text ("example \0")
    close-start-element, 0,0

One TLA represents each portion of the document segment.

In addition to outputting a stream of TLAs, the XSLT stylesheet compiler 108 may also generate PPE machine code from the XSLT stylesheet 102 and write the machine code to PPE program memory on the XML accelerator 110.

The XML accelerator 110 may be an XML accelerator card plugged into the XML appliance 106. One example is the DataPower XG4 accelerator card. The XML accelerator 110 may input the XML base document 104 and the stream of TLAs from the compiled XSLT stylesheet 102 from the XSLT stylesheet compiler 108, perform the necessary transformations with the XML data, and output a final document 112.

The final document 112 may be another XML document. Alternatively, the final document 112 may be a document in a user-readable format or a document for use on the web. Using the XSLT stylesheet 102 from Example Code 1 to transform the XML base document 104 from Example Code 2, the final document 112 would be a HyperText Markup Language (HTML) document similar to the following example:

```
<html>
<body>
<h2>My CD Collection</h2>
    <p>
        Title: <span style="color:#ff0000">
        Sargent Pepper's Lonely Hearts Club Band </span>
        <br />
        Artist: <span style="color:#00ff00">
        The Beatles </span>
        <br />
    </p>
    <p>
        Title: <span style="color:#ff0000">
```

-continued

```
         Hey Jude </span>
         <br />
         Artist: <span style="color:#00ff00">
         The Beatles </span>
         <br />
      </p>
      <p>
         Title: <span style="color:#ff0000">
         Surfin' USA </span>
         <br />
         Artist: <span style="color:#00ff00">
         The Beach Boys </span>
         <br />
      </p>
   </body>
</html>
```

Example Code 3

Figure 2:
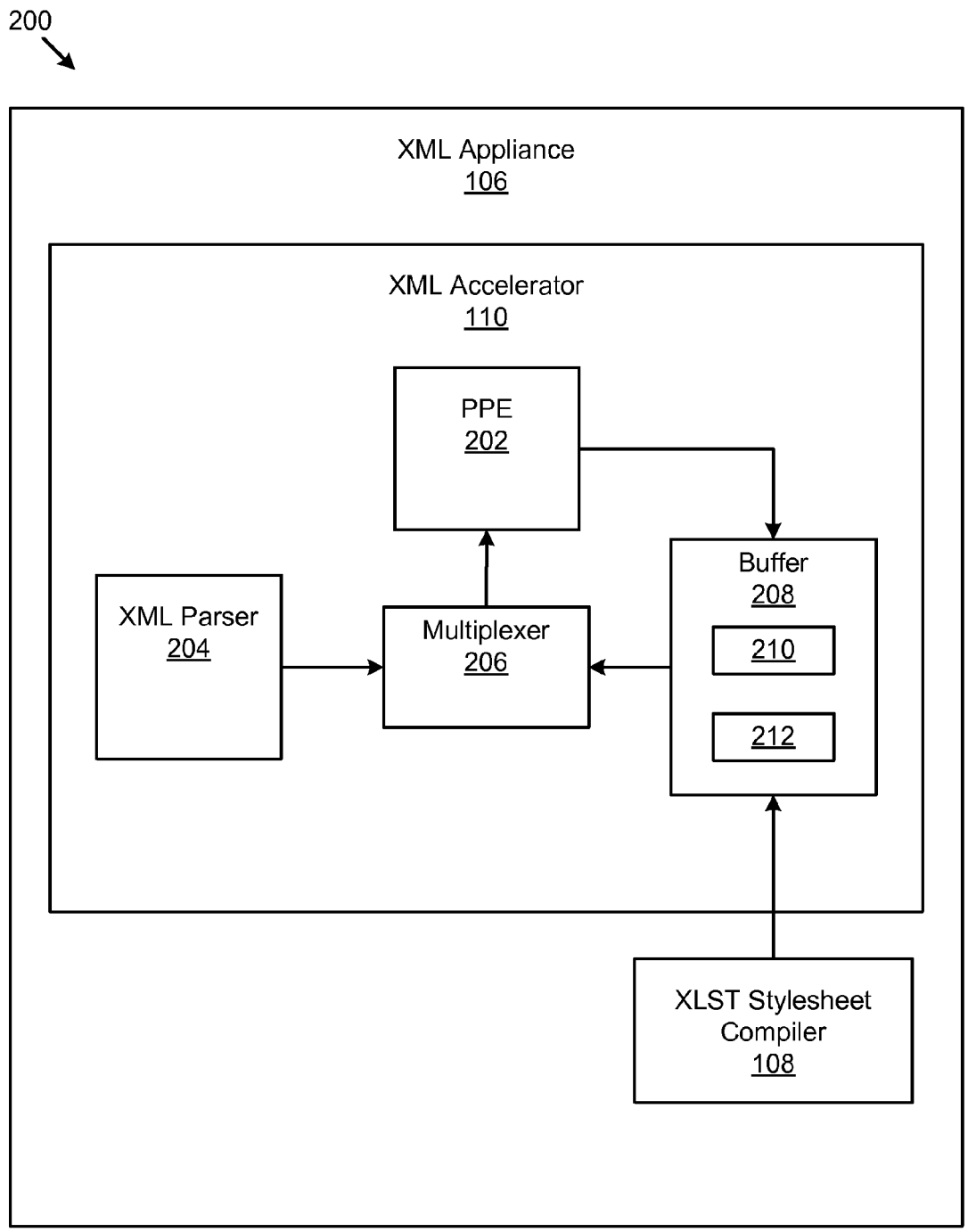
FIG. 2 is a detailed schematic block diagram illustrating one embodiment of a system for supporting variable data structures and constant data structures in a hardware-based XML PPE.

FIG. 2 illustrates another embodiment of a system for supporting variable data structures and constant data structures in a hardware-based XML PPE. The system may include an XML appliance 106 with an XSLT stylesheet compiler 108 and an XML accelerator 110 with a PPE 202, an XML parser 204, a buffer 208, and a multiplexer 206. Furthermore, the buffer 208 may include a table 210 and multiple node-sets 212 stored in memory. The XML appliance 106 and XSLT stylesheet compiler 108 may include substantially the same features as described above in relation to FIG. 1.

Furthermore, the PPE 202 may be a micro-controller with a specialized instruction set optimized for XML processing. The PPE 202 receives input TLAs which the PPE 202 processes individually. The PPE 202 then sends the processed TLAs downstream for output generation. A standard PPE 202 which cannot support stored data structures is limited in the XML base documents 104 which the PPE 202 can process. For example, if the "artist" and "title" tags are reversed in the XML base document 104, the PPE 202 could not process the document, or perform any transformations on other documents which require a portion of the XML to be stored and reused.

The PPE 202 may include an XML parser 204 that parses the base XML document 104 into a TLA stream made up of a plurality of TLAs. In addition, the PPE 202 may include a buffer 208 with a table 210 and multiple node-sets 212. Furthermore, the PPE 202 may be configured to incorporate the node-sets 212 stored in the buffer 208 as will be described hereafter. In a further embodiment, the XML accelerator 110 may contain multiple PPEs 202 that carry out specific functions. For example, one PPE 202 may perform schema validation and output the TLA stream into another PPE 202 which performs XML transformations.

In one embodiment, the buffer 208 resides on the XML accelerator 110, but the buffer 208 is controlled by the PPE 202. As known by one of ordinary skill in the art, the buffer 208 may be implemented with volatile memory such as random access memory (RAM), non-volatile memory, or the like. The table 210 may be a lookup table storing a number mapped to a node-set 212 that is also stored in the buffer 208.

As used herein, a node-set 212 is a set of XML document fragments that may represent a set of XML document nodes (such as start-tag, attributes, end-tag and content). An XML document fragment may be represented by a sequence of TLAs outputted by the XML parser 204. Therefore, a single node-set 212 in the buffer 208 is made up of a concatenated set of sequences of TLAs. Node sets are represented this way because the PPE 202 has the ability to process sequences of TLAs. The stylesheet compiler 108 may compile XML Path Language (XPATH) expressions (which create node-sets 212) into PPE 202 instructions which, when executed by the PPE 202, filters a sequence of TLAs, thereby selecting parts of (or nodes of) the document. The PPE 202 may obtain stored TLAs by referring to a number representing the corresponding node-set 212 in the table 210. The output from the table 210 may be a pointer to the node-set 212 stored in memory.

By adding a buffer 208 to the XML accelerator 110 and configuring the PPE 202 to store TLAs in the buffer 208, the PPE 202 may perform complex XML transformations. Execution of these XML transformations in hardware results in significant time and resource savings.

Finally, to switch between TLAs stored in the buffer 208 and the standard TLA stream, or TLAs received from other sources known in the art, the system may include a multiplexer 206. The multiplexer 206 may reside on the XML accelerator 110 and may be controlled by the PPE 202.

Figure 3:
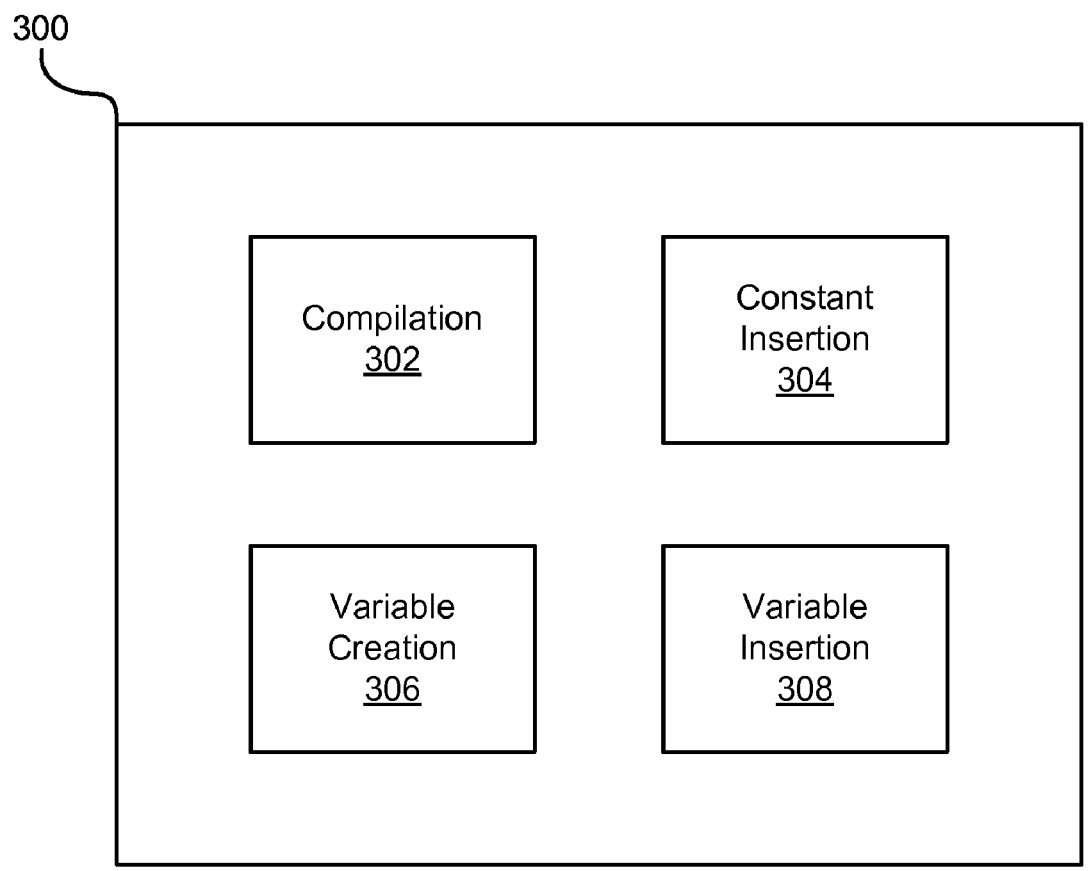
FIG. 3 is a schematic block diagram illustrating one embodiment of a computer program product for supporting variable data structures and constant data structures in a hardware-based XML PPE.

FIG. 3 illustrates one embodiment of a computer program product for supporting variable data structures and constant data structures in a hardware-based XML PPE. The computer program product includes a compilation module 302, constant insertion module 304, variable creation module 306, and a variable insertion module 308.

In one embodiment, the compilation module 302 compiles an XSLT stylesheet 102 into a plurality of TLAs and PPE machine code. The compilation module 302 may reside on the XLST stylesheet compiler. Furthermore, during compilation, the compilation module 302 may create constant node-sets 212 made up of constant TLAs. A constant TLA is a TLA that represents static XML text and elements. For example, the compilation module 302 may compile the text "<p>" in the XSLT stylesheet 102 into the following TLA:

start-tag,1, qname for p

This TLA represents XML text that does not reference an XML variable to be obtained from the XML base document 104 by the PPE 202.

The compilation module 302 may create these constant TLAs and store them as constant node-sets 212 in the buffer 208. A constant node-set 212 is a node-set containing constant TLAs stored in memory. The compilation module 302 may store each constant TLA as a pointer to a linked list of fixed sized memory blocks storing the text associated with the TLA as will be described hereafter.

In addition, the compilation module 302 maps each constant node-set 212 to a constant table 210. The constant table 210 is a table 210 in the buffer 208 with a unique identifier to reference the memory location of constant node-sets 212. Finally, the PPE machine code obtained from the compiled XSLT stylesheet, contains executable instructions to dictate XML transformations and PPE 202 operation. The PPE machine code may specify which constant node-sets 212 to insert.

In one embodiment, the constant insertion module 304 inserts the constant TLAs into an output stream. For example, an instruction may be added to the PPE's 202 conventional instruction set which, when executed, causes the operation "insert constant node-set 10." The constant insertion module 304 then inserts the corresponding constant TLAs from the constant node-set 212 referenced from slot 10 of the constant table 210.

In one embodiment, the variable creation module 306 creates one or more variable node-sets 212 during processing of the XML base document 104. As with the constant node-sets 212, each variable node-set 212 is an XML document fragment made up of one or more TLAs. However, variable node-sets 212 contain variable TLAs, which are TLAs selected and saved from the parsed base document by the PPE 202.

The variable creation module 306 may append the current TLA being processed to a variable node-set 212 and store the variable node-set 212 in the buffer 208. The variable creation module 306 may use both implied copying (such as TLA mode, drop mode, tree mode) and explicit copying with an instruction such as "append current TLA to variable." Using both copying methods allows the variable creation module 306 to save a large set of TLAs with the current implied mode, but also save other variables with explicit copying. Like the constant TLAs, a variable TLA may be created as a pointer to a linked list of fixed sized memory blocks storing the text associated with the TLA.

Furthermore, like the constant node-sets 212, each variable node-set 212 is mapped to a variable table 210. In one embodiment, the PPE 202 uses a single table 210 for both the common table 210 and the variable table 210. In certain embodiments, the PPE 202 maintains each table 210 separately in different memory locations.

In one embodiment, the variable insertion module 308 inserts one or more variable TLAs into the output stream. The variable insertion module 308 inserts each variable TLA from a variable node-set 212. Each variable node-set 212 is referenced from the variable table 210. For example, the PPE machine code instructions may state "insert variable node-set 20." The variable insertion module 308 then inserts the corresponding variable TLAs from the variable node-set 212 referenced from slot 20 of the variable table 210.

Figure 4:
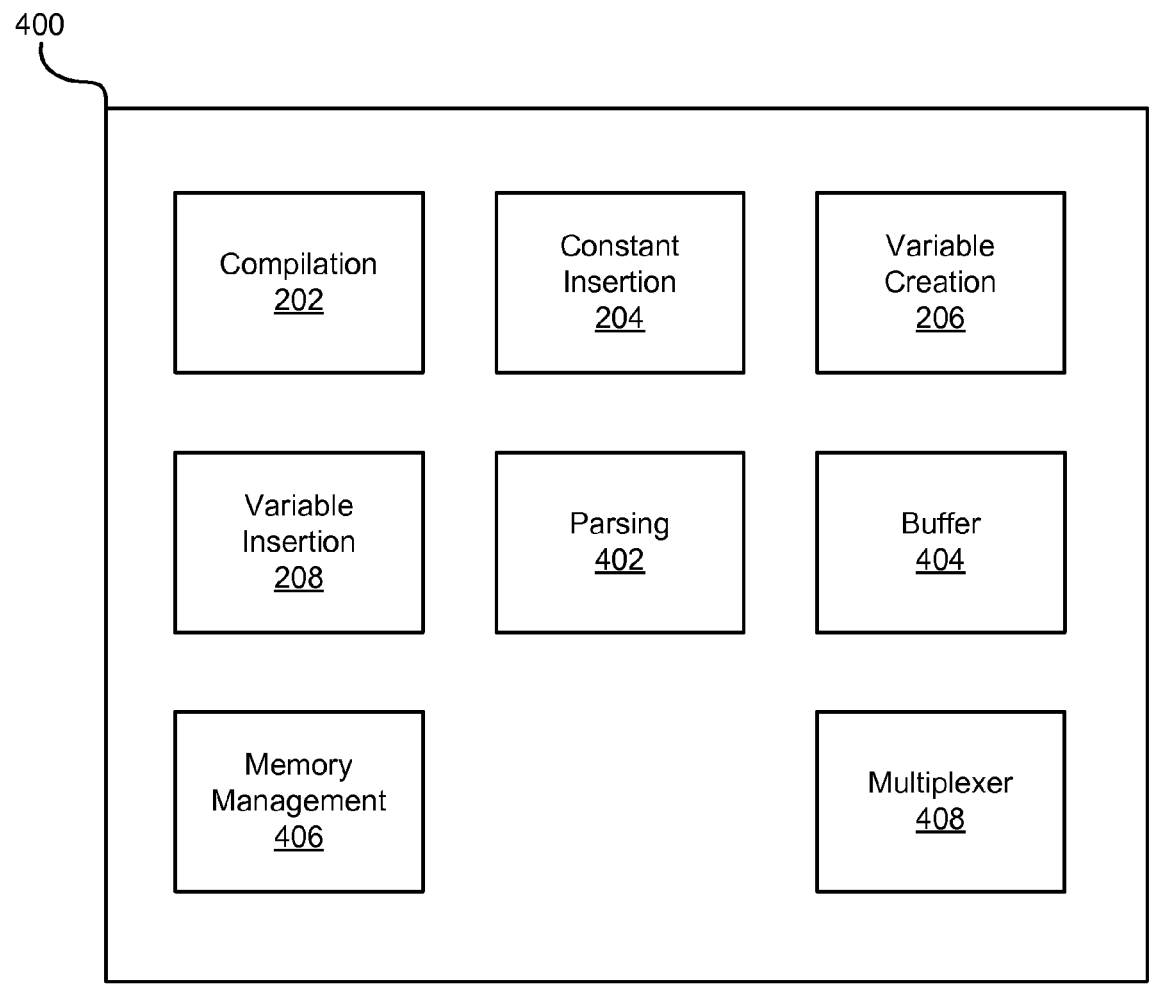
FIG. 4 is a detailed schematic block diagram illustrating one embodiment of a computer program product for supporting variable data structures and constant data structures in a hardware-based XML PPE.

FIG. 4 illustrates another embodiment of a computer program product for supporting variable data structures and constant data structures in a hardware-based XML PPE. The computer program product 400 includes the compilation module 302, the constant insertion module 304, the variable creation module 306, and the variable insertion module 308, wherein these modules include substantially the same features as described above in relation to FIG. 3. Additionally, in one embodiment, the computer program product contains a parsing module 402, a buffer module 404, a memory management module 406, and a multiplexer module 408.

In one embodiment the parsing module 402 parses a base XML document into a TLA stream. In one embodiment, the parsing module 402 parses the base XML document into a stream of variable TLAs. The parsing module 402 may reside on the XML accelerator 110 and may feed the resulting TLA stream into the PPE 202 portion of the XML accelerator 110 for processing.

In one embodiment, the buffer module 404 stores the variable TLAs and constant TLAs in a buffer 208. The buffer module 404 may store the variable TLAs and constant TLAs in a shared buffer 208. Alternatively, the buffer module 404 may store the variable TLAs and constant TLAs in separate buffers 208.

The buffer module 404 may store a constant or a variable TLA as a pointer to a linked list of fixed sized memory blocks storing the text associated with the TLA. If the text fits in a single memory block, the link-pointer (for the next memory block in the chain) for that memory block will be NULL. If the text needs two memory blocks, then the link-pointer for the first memory block points to the second memory block and the link pointer for the second memory block is NULL. One of ordinary skill in the art realizes that other methods of storing values in memory may be used.

Furthermore, more than one TLA may reference the same linked memory block list containing text. More than one TLA may reference the same XML text in the XSLT stylesheet 102 or XML base document 104. Therefore, by referencing the same text blocks instead of creating redundant text blocks, the buffer module 404 saves time and memory resources. For example, two different TLAs may both reference "<p>." Instead of creating two text block sets with the corresponding TLA text representation for "<p>," the buffer module 404 creates the first text blocks for the first instance of "<p>," and adds another reference to the same text block set upon the second reference.

The buffer module 404 may use reference counting to track the number of TLAs that reference a certain set of memory blocks of text. In one embodiment, the text has a reference counter stored in a header of the first memory block of the text which is initialized to one when the TLA is created. When a TLA is duplicated, this reference counter is incremented. Therefore, if two TLAs refer to the text, the counter is two. If three TLAs refer to the text, then the counter is three. When a TLA is discarded, the reference counter is decremented. Constant TLAs do not need reference counting since their associated text memory blocks would never be unreferenced, and therefore, freed. Therefore, to distinguish the TLA type, whether the TLA is a constant TLA or a variable TLA, a TLA indicator such as a flag bit may be used in the TLA.

In one embodiment, the memory management module 406 frees the memory blocks of the linked list associated with the text in response to the reference counter equaling zero. When no TLAs reference text, the memory blocks are no longer needed. In one embodiment, the memory management module 406 maintains a pointer to the last block in the chain. In this embodiment, the memory management module 406 may free all of the blocks at once by splicing the entire chain into the free-list and writing the head of the free list into the link-pointer of the last block of the chain. Therefore, the memory management module 406 does not have to iterate through all of the memory blocks during a free operation.

In one embodiment, the multiplexer module 408 selects an input stream to be fed into the PPE 202. The input stream may be a constant TLA input stream, a variable TLA input stream, and a standard TLA input stream. Furthermore, the multiplexer module 408 may be one embodiment of the multiplexer 206. In one embodiment, the PPE machine code controls the multiplexor 206. For example, a PPE machine code instruction may state: "push input stream Z." The TLAs now come from the list stored in the specified variable or constant instead of from the standard input such as from a schema validation PPE 202. When all of the TLAs from the variable node-set 212 are exhausted, the input from the previous stream continues. In one embodiment, the multiplexor module 408 includes a stack data structure containing values that determine which stream the multiplexor 206 selects. The value in the top of the stack controls the multiplexor 206. The PPE machine code instructions may instruct the multiplexor module 408 to push or pop (add or remove) values from this stack. Therefore, when a "pop" occurs, the multiplexor 206 returns to input from the previous stream. In one embodiment, the end of the TLAs from a node-set 212 is explicit: there is an "end of input TLA" to alert the multiplexer module 408 that a pop has occurred.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
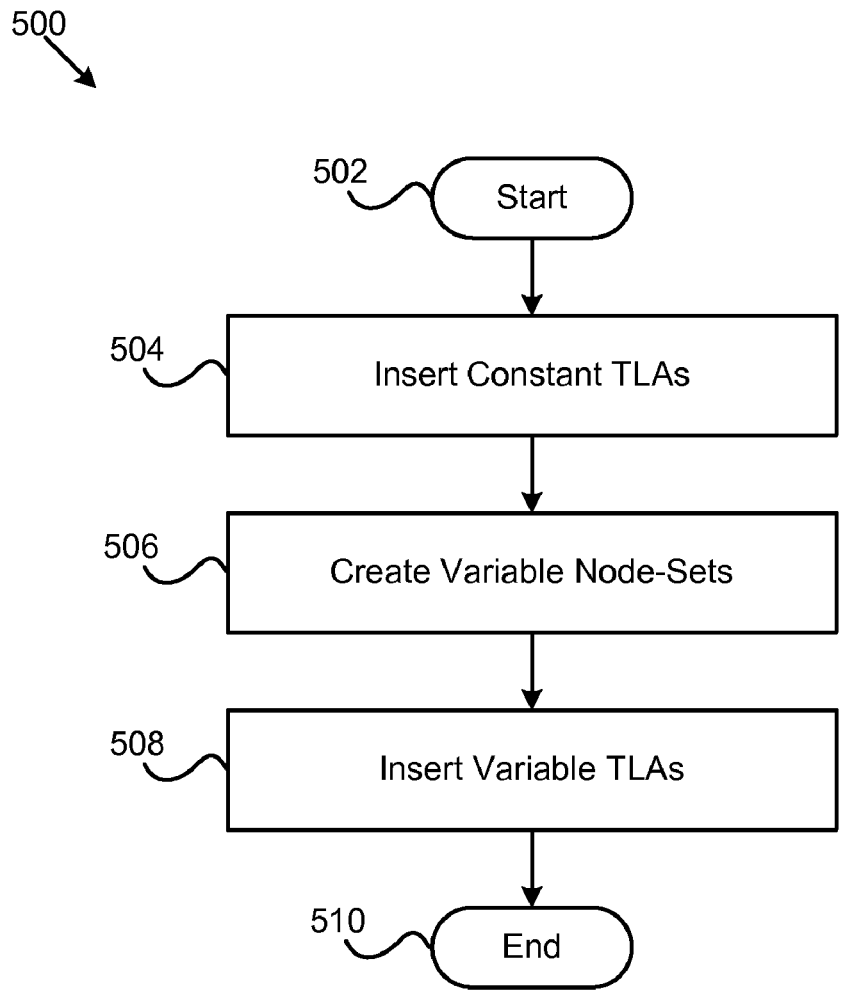
FIG. 5 is a schematic flow chart diagram illustrating one embodiment of a method for supporting variable data structures and constant data structures in a hardware-based XML PPE.

FIG. 5 illustrates one embodiment of a method 500 for supporting variable data structures and constant data structures in a hardware-based XML PPE. The steps of this method may be performed in any order, as the PPE 202 may encounter constant or variable TLAs at various times throughout the processing of the XML. The method 500 starts 502 when the constant insertion module 304 inserts 504 one or more constant TLAs into an output stream. The constant insertion module 304 inserts each of these constant TLAs from constant node-sets 212 which the constant table 210 references. Next, the variable creation module 306 creates 506 one or more variable node-sets 212 that include one or more variable TLAs.

The variable insertion module 308 inserts 508 one or more variable TLAs into the output stream. Each of these variable TLAs is inserted from a variable node-set 212 which the variable table 210 references. Then the method 500 ends 510.

Figure 6:
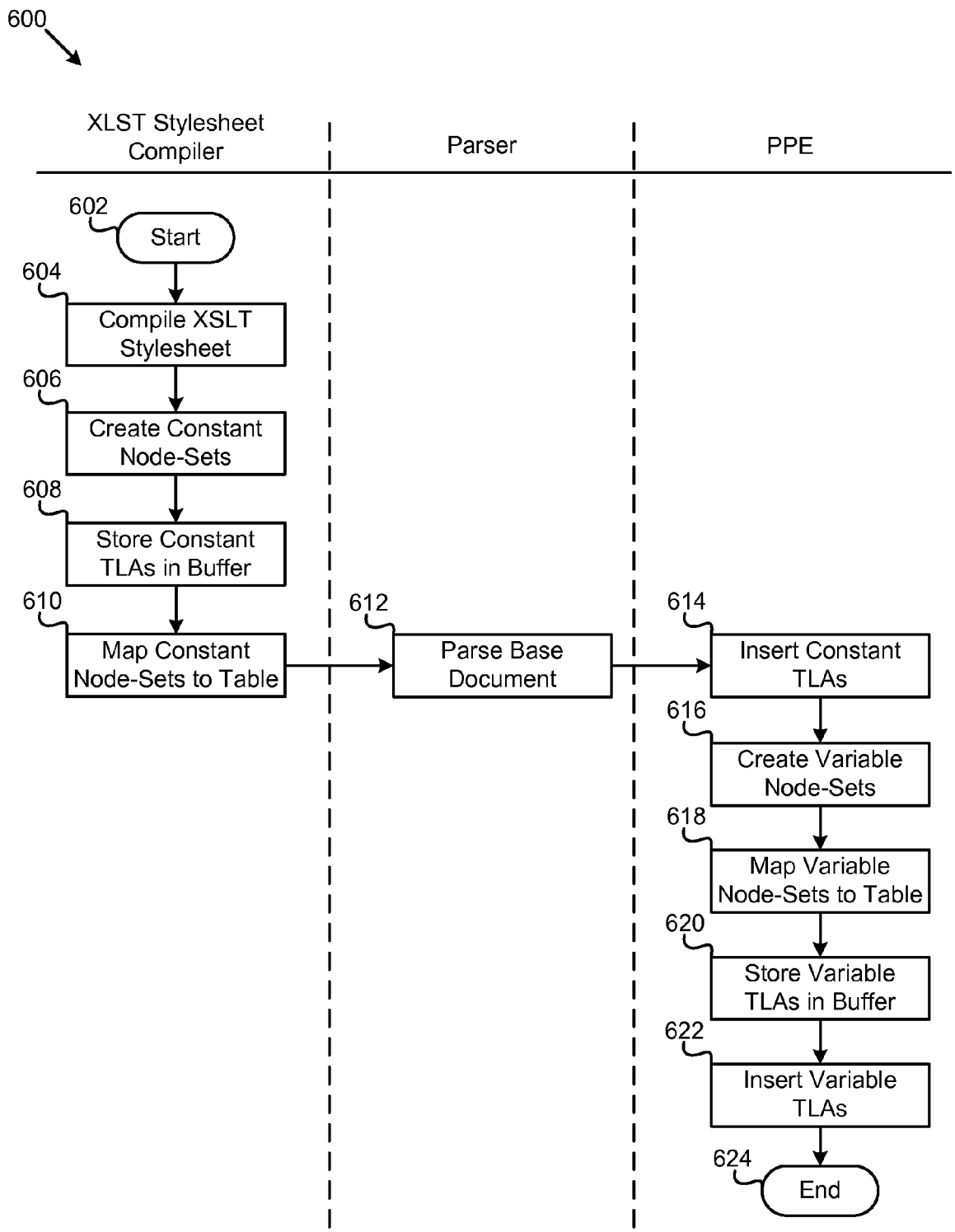
FIG. 6 is a detailed schematic flow chart diagram illustrating one embodiment of a method for supporting variable data structures and constant data structures in a hardware-based XML PPE.

FIG. 6 illustrates a detailed embodiment of a method 600 for supporting variable data structures and constant data structures in a hardware-based XML PPE. First, the method 600 starts 602 on the XSLT stylesheet compiler 108 when the compilation module 302 compiles 604 an XSLT stylesheet 102 into a plurality of TLAs and PPE machine code. Next, the compilation module 302 creates 606 one or more constant node-sets 212. These constant node-sets 212 include multiple constant TLAs. The compilation module 302 then stores 608 these constant TLAs in a buffer 208 and maps 610 the constant node-sets 212 to a constant table 210. Next, the parsing module 402 of the XML parser parses 612 a base XML document into a variable TLA stream.

As the PPE 202 begins processing the XML, the constant insertion module 304 of the PPE 202 inserts 614 one or more constant TLAs into an output stream. The constant insertion module 304 references each constant node-set 212 from the constant table 210 to obtain the constant TLAs. Next, the variable creation module 306 creates 616 one or more variable node-sets 212. As with the constant node-sets 212, each variable node-set 212 contains variable TLAs. The variable creation module 306 then maps 618 the variable node-sets 212 to a variable table 210 and stores 620 the variable TLAs in a buffer 208. Finally, the variable insertion module 308 inserts 622 the variable TLAs into the output stream. These variable TLAs are inserted from the corresponding variable node-set 212 referenced from the variable table 210. Then, the method 600 ends 624.

The following pseudocode is one example of the processing logic of the PPE 202 for the XSLT stylesheet 102 in Example Code 1 and the XML base document 104 in Example Code 2:

```
constant table: (created when the XSLT stylesheet was compiled)
  1: points to a node-set of TLAs which represent: <html><body>
     <h2>My CD Collection</h2>
  2: points to a node-set of TLAs which represent: <p>
  3: points to a node-set of TLAS which represent: </body></html>
  4. points to a node-set of TLAs which represent </p>
  5. points to a node-set of TLAs which represent <"Title: <span
     style="color:#ff0000">
  6. points to a node-set of TLAs which represent "</span><br />
  7. points to a node-set of TLAs which represent "Artist: <span
     style="color:#00ff00">"
variable table: (created dynamically as the program is being executed )
  1. points to the first TLA representing "title"
  2. points to the first TLA representing "artist"
Start:
  call Subroutine
  done.
Subroutine:
  match "/"
    write constant 1 (see "constant table" - select constant 1 as input,
    copy out until end)
    call Subroutine
    write constant 3
    return
  match "cd"
    write constant 2
    read rest of body of "cd", saving "title" in variable 1, "artist"
    in variable 2.
    select variable 1 as input
    call Subroutine
    select variable 2 as input
    call Subroutine
    pop 2 variables.
    write contant 4
    return
  match "title"
    write contant 5
    copy current text node out
    write constant 6
    return
  match "artist"
    write constant 7
    copy current text node out
    write constant 6
    return
  default
    copy current text node out
    return
```

Example Code 4

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for supporting variable data structures and constant data structures in a hardware-based Extensible Markup Language (XML) Post Processing Engine (PPE), the method comprising:

compiling an XML Transformations (XSLT) stylesheet into a plurality of constant Type-Length-Attributes (TLAs) and PPE machine code;

storing at least a portion of the plurality of constant TLAs as constant node-sets in a buffer in communication with a PPE, each constant node-set comprising one or more constant TLAs, each constant TLA comprising a static XML text element;

inserting one or more constant TLAs specified by the PPE machine code into an output stream from the one or more constant node-sets stored in the buffer;

storing at least a portion of the plurality of variable TLAs as variable node-sets in the buffer, each variable node-set comprising one or more variable TLAs, each variable TLA comprising an XML variable value; and inserting one or more variable TLAs specified by the PPE machine code into the output stream from the one or more variable node-sets stored in the buffer.

2. The method of claim 1, further comprising parsing a base XML document into a TLA stream, the TLA stream comprising a plurality of variable TLAs.

3. The method of claim 2, further comprising selecting an input stream from the group consisting of a constant TLA input stream, a variable TLA input stream, and a standard TLA input stream.

4. The method of claim 1, wherein each constant node-set is mapped to a constant table and each variable node-set is mapped to a variable table.

5. The method of claim 1, wherein each of the one or more variable TLAs and each of the one or more constant TLAs comprises a pointer to a linked list, the linked list configured to store text and comprising one or more memory blocks and a reference counter.

6. The method of claim 5, further comprising freeing the one or more memory blocks of the linked list in response to the reference counter equaling zero.

7. An apparatus for supporting variable data structures and constant data structures in a hardware-based Extensible Markup Language (XML) Post Processing Engine (PPE), the apparatus comprising:
  a compilation module configured to compile an XML Transformations (XSLT) stylesheet into a plurality of constant Type-Length-Attributes (TLAs) and PPE machine code and configured to store at least a portion of the plurality of constant TLAs as constant node-sets in a buffer in communication with a PPE, each constant node-set comprising one or more constant TLAs, each constant TLA comprising a static XML text element;
  a constant insertion module configured to insert one or more constant TLAs specified by the PPE machine code into an output stream from a constant node-set stored in the buffer;
  a variable creation module configured to store at least a portion of the plurality of variable TLAs as variable node-sets in the buffer, each variable node-set comprising one or more variable TLAs, each variable TLA comprising an XML variable value; and
  a variable insertion module configured to insert one or more variable TLAs specified by the PPE machine code into the output stream from the one or more variable node-sets stored in the buffer,
  wherein all or a portion of the compilation module, the constant insertion module, the variable creation module, and the variable insertion module comprise one or more of hardware circuits and executable code stored on one or more non-transitory computer readable storage media.

8. The apparatus of claim 7, further comprising a parsing module configured to parse a base XML document into a TLA stream, the TLA stream comprising a plurality of variable TLAs.

9. The apparatus of claim 8, further comprising a multiplexer module configured to select an input stream from the group consisting of a constant TLA input stream, a variable TLA input stream, and a standard TLA input stream.

10. The apparatus of claim 7, wherein each constant node-set is mapped to a constant table and each variable node-set is mapped to a variable table.

11. The apparatus of claim 7, wherein each of the one or more variable TLAs and each of the one or more constant TLAs comprises a pointer to a linked list, the linked list configured to store text and comprising one or more memory blocks and a reference counter.

12. The apparatus of claim 11, further comprising a memory management module configured to free the one or more memory blocks of the linked list in response to the reference counter equaling zero.

13. The apparatus of claim 11, wherein each of the one or more variable TLAs and each of the one or more constant TLAs further comprises a TLA indicator configured to indicate a TLA type.

14. A system for supporting variable data structures and constant data structures in a hardware-based Extensible Markup Language (XML) Post Processing Engine (PPE), the system comprising:
  a buffer;
  an XML Transformations (XSLT) stylesheet compiler in communication with the buffer, the XSLT stylesheet compiler configured to:
    compile an XSLT stylesheet into a plurality of constant Type-Length-Attributes (TLAs) and PPE machine code;
    store at least a portion of the plurality of constant TLAs as constant node-sets in the buffer, each constant node-set comprising one or more constant TLAs, each constant TLA comprising a static XML text element;
  an XML accelerator card comprising:
    a Post Processing Engine (PPE) in communication with the buffer, the PPE configured to:
      insert one or more constant TLAs specified by the PPE machine code into an output stream from a constant node-set stored in the buffer;
      store at least a portion of the plurality of variable TLAs as variable node-sets in the buffer, each variable node-set comprising one or more variable TLAs, each variable TLA comprising an XML variable value; and
      insert one or more variable TLAs specified by the PPE machine code into the output stream from the one or more variable node-sets stored in the buffer.

15. The system of claim 14, wherein the XML accelerator further comprises an XML parser, the XML parser configured to parse a base XML document into a TLA stream, the TLA stream comprising a plurality of variable TLAs.

16. The system of claim 15, further comprising a multiplexer configured to select an input stream from the group consisting of a constant TLA input stream, a variable TLA input stream, and a standard TLA input stream.

17. The system of claim 14, wherein each constant node-set is mapped to a constant table and each variable node-set is mapped to a variable table.

18. The system of claim 14, wherein each of the one or more variable TLAs and each of the one or more constant TLAs comprises a pointer to a linked list, the linked list configured to store text and comprising one or more memory blocks and a reference counter.

19. The system of claim 18, wherein the XML accelerator is further configured to free the one or more memory blocks of the linked list in response to the reference counter equaling zero.

20. The system of claim 18, wherein each of the one or more variable TLAs and each of the one or more constant TLAs further comprises a TLA indicator configured to indicate a TLA type.

21. A computer program product stored on a non-transitory computer readable storage medium, the computer program product for supporting variable data structures and constant data structures in a hardware-based Extensible Markup Language (XML) Post Processing Engine (PPE), the computer program product comprising:

a parsing module configured to parse a base XML document into a plurality of variable Type-Length-Attributes (TLAs);

a compilation module configured to compile an XML Transformations (XSLT) stylesheet into a plurality of constant TLAs and PPE machine code and configured to store at least a portion of the plurality of constant TLAs as constant node-sets in a buffer in communication with a PPE, each constant node-set comprising one or more constant TLAs, each constant TLA comprising a static XML text element;

a constant insertion module configured to insert one or more constant TLAs specified by the PPE machine code into an output stream from a constant node-set stored in the buffer;

a variable creation module configured to store at least a portion of the plurality of variable TLAs as variable node-sets in the buffer, each variable node-set comprising one or more of the variable TLAs from the base XML document, each variable TLA comprising an XML variable value; and a variable insertion module configured to insert one or more variable TLAs specified by the PPE machine code into the output stream from the one or more variable node-sets stored in the buffer.

* * * * *